(12) United States Patent
Anderson et al.

(10) Patent No.: US 7,514,670 B2
(45) Date of Patent: Apr. 7, 2009

(54) DISTRIBUTED FIBER OPTIC SENSOR WITH LOCATION CAPABILITY

(75) Inventors: Duwayne Anderson, Saint Helens, OR (US); Shailesh Singh, Sherwood, OR (US)

(73) Assignee: Fiber SenSys LLC, Hillsboro, OR (US)

( * ) Notice: Subject to any disclaimer, the term of this patent is extended or adjusted under 35 U.S.C. 154(b) by 0 days.

(21) Appl. No.: 11/212,612

(22) Filed: Aug. 29, 2005

(65) Prior Publication Data

US 2007/0096007 A1    May 3, 2007

(51) Int. Cl.
*G01J 1/04* (2006.01)
*G01J 1/42* (2006.01)
*G01J 5/08* (2006.01)

(52) U.S. Cl. .............. 250/227.14; 250/227.16; 385/13; 340/552

(58) Field of Classification Search ........... 250/227.14, 250/227.16; 385/13; 340/552, 557, 565, 340/566
See application file for complete search history.

(56) References Cited

U.S. PATENT DOCUMENTS

| | | | |
|---|---|---|---|
| 4,300,813 A | | 11/1981 | Gravel |
| 4,302,835 A | * | 11/1981 | McMahon .................. 370/445 |
| 4,367,040 A | * | 1/1983 | Goto ........................... 356/44 |
| 4,398,795 A | | 8/1983 | Palmer |
| 4,421,384 A | | 12/1983 | McMahon |
| 4,777,476 A | | 10/1988 | Dank |
| 4,887,879 A | | 12/1989 | Prucnal et al. |
| 5,093,569 A | | 3/1992 | Krumboltz et al. |
| 5,144,689 A | | 9/1992 | Lovely |
| 5,194,847 A | | 3/1993 | Taylor et al. |
| 5,311,592 A | | 5/1994 | Udd |
| 5,337,376 A | * | 8/1994 | Ravetti et al. .................. 385/12 |
| 5,359,405 A | * | 10/1994 | Andrews .................... 356/35.5 |

(Continued)

FOREIGN PATENT DOCUMENTS

WO    WO2006096562 A2    9/2006

(Continued)

OTHER PUBLICATIONS

Shlyagin, M.G., et al., "Large Scale Sensing Arrays Based on Fiber Bragg Gratings", Proceedings of SPIE, vol. 4578 (2002), p. 320-327.

(Continued)

*Primary Examiner*—Seung C Sohn
(74) *Attorney, Agent, or Firm*—Ganz Law, P.C.

(57) ABSTRACT

A spatially distributed sensor system has an optical transmitter, an optical conduit optically coupled to the optical transmitter at an input position, and a sensing element optically coupled to the optical conduit at a position along the optical conduit spatially separated from the input position. The sensing element is structured to split off a fraction of light from the optical transmitter upon being coupled into the optical conduit and to return light to the optical conduit. The spatially distributed sensor system also has an optical receiver coupled to the optical conduit to receive at least a portion of light from the optical conduit that includes light returned to the optical conduit from the sensing element. An analysis of light received by the optical receiver provides information to determine a position of the sensing element.

24 Claims, 5 Drawing Sheets

U.S. PATENT DOCUMENTS

| | | | |
|---|---|---|---|
| 5,402,231 A | | 3/1995 | Udd |
| 5,436,167 A | * | 7/1995 | Robillard .................... 436/165 |
| 5,448,657 A | | 9/1995 | Kim et al. |
| 5,475,489 A | * | 12/1995 | Gottsche .................... 356/364 |
| 5,567,622 A | * | 10/1996 | Jaduszliwer et al. ........ 436/106 |
| 5,815,270 A | | 9/1998 | Lee |
| 5,999,544 A | * | 12/1999 | Petersen ........................ 372/6 |
| 6,058,226 A | | 5/2000 | Starodubov |
| 6,150,903 A | | 11/2000 | Asakawa et al. |
| 6,529,444 B2 | * | 3/2003 | Vakoc ........................ 367/149 |
| 6,584,241 B2 | * | 6/2003 | Davis et al. .................... 385/5 |
| 6,591,025 B1 | * | 7/2003 | Siems et al. .................. 385/12 |
| 6,621,947 B1 | | 9/2003 | Tapanes et al. |
| 6,778,717 B2 | | 8/2004 | Tapanes et al. |
| 7,046,867 B2 | * | 5/2006 | Bohnert et al. ................ 385/12 |
| 7,092,586 B2 | | 8/2006 | Vokey et al. |
| 7,120,324 B2 | | 10/2006 | Murphy et al. |
| 7,142,737 B1 | | 11/2006 | Murphy et al. |
| 7,206,469 B2 | | 4/2007 | Murphy et al. |
| 7,333,681 B2 | | 2/2008 | Murphy et al. |
| 2003/0002769 A1 | | 1/2003 | Lovely et al. |
| 2005/0002017 A1 | | 1/2005 | Haran |
| 2005/0267605 A1 | | 12/2005 | Lee et al. |
| 2006/0002649 A1 | | 1/2006 | Murphy et al. |
| 2006/0045426 A1 | | 3/2006 | Poole |
| 2006/0081772 A1 | | 4/2006 | Williams et al. |
| 2006/0153491 A1 | | 7/2006 | Murphy et al. |
| 2006/0153520 A1 | | 7/2006 | Murphy et al. |
| 2006/0291795 A1 | | 12/2006 | Murphy et al. |
| 2007/0029991 A1 | | 2/2007 | Murphy et al. |
| 2007/0046481 A1 | | 3/2007 | Vokey et al. |
| 2007/0069893 A1 | | 3/2007 | Anderson |
| 2007/0077064 A1 | | 4/2007 | Murphy et al. |
| 2007/0086693 A1 | | 4/2007 | Murphy et al. |
| 2007/0086694 A1 | | 4/2007 | Murphy et al. |
| 2007/0092176 A1 | | 4/2007 | Murphy et al. |
| 2007/0110247 A1 | | 5/2007 | Murphy et al. |
| 2007/0113268 A1 | | 5/2007 | Murphy et al. |
| 2007/0116400 A1 | | 5/2007 | Murphy et al. |
| 2007/0133922 A1 | | 6/2007 | Murphy et al. |
| 2008/0144992 A1 | | 6/2008 | Thompson et al. |

FOREIGN PATENT DOCUMENTS

| | | |
|---|---|---|
| WO | WO2007027540 A2 | 3/2007 |
| WO | WO2008011058 A2 | 1/2008 |

OTHER PUBLICATIONS

Hotate, Kazuo et al., "Stress-Location Measurement Along an Optical Fiber by Synthesis of Triangle-Shaped Optical Coherence Function", IEEE Photonics Technology Letters, vol. 13, No. 3, Mar. 2001, p. 233-235.

Bock, Wojtek et al., "Polarimetric and Intermodal Interference Sensitivity to Hydrostatic Pressure, Temperature, and Strain of Highly Birefringent Optical Fibers", Optics Letters, vol. 18, No. 22, Nov. 15, 1993, p. 19791981.

Vakoc, Benjamin J. et al., "A Novel Fiber Optic Sensor Array Based on the Sagnac Interferometer", SPIE, Conference on Fiber Optic Sensor Technology and Applications, Sep. 1999, vol. 3860, p. 276-284.

Mazzoni, David L. et al., "Hybrid Fiber-Optic Sensor Using True Heterodyne Measurement Techniques", Optics Letters, vol. 16, No. 8, Apr. 15, 1991, p. 614-616.

Haibao, Lu et al ., "Research of the Distributed Fiber Optic Pressure Sensor", SPIE, vol. 3555 (1998), p. 343-347.

Kwong, Norman S.K., "Fiber-Optic Sensor Using a Tandem Combination of a Multimode Fiber and a Self-Pumped Phase Conjugator", Optics Letters, vol. 14, No. 11, Jun. 1, 1989, p. 590-592.

Fang, Xiaojun, "Fiber-Optic Distributed Sensing by a Two-Loop Sagnac Interferometer", Optics Letters, vol. 21, No. 6, Mar. 15, 1996, p. 444-446.

Kumar, Arun et al., "Studies on a Few-Mode Fiber-Optic Strain Sensor Based on LP01-LP02 Mode Interference", Journal of Lightwave Technology, vol. 19, No. 3, Mar. 2001, p. 358-362.

Afshar, Sharaam et al., "Effect of the Finite Extinction Ratio of an Electro-Optic Modulator on the Performance of Distributed Probe—Pump Brillouin Sensor Systems", Optics Letters, vol. 28, No. 16, Aug. 15, 2003, p. 1418-1420.

Cokgor, I. et al., "Distributed Optical-Fiber Sensor for Spatial Location of Mode Coupling by Using the Optical Kerr Effect", Optics Letters, vol. 18, No. 9, May 1, 1993, p. 705-707.

Rogers, A.J., "Distributed Measurement of Strain using Optical-Fibre Backscatter Polarimetry".

He, Zuyuan, "Distributed Fiber-Optic Stress-Location Measurement by Arbitrary Shaping of Optical Coherence Function", Journal of Lightwave Technology, vol. 20, No. 9, Sep. 2002, p. 1715-1723.

Alasaarela, Iikka et al., "Comparison of Distributed Fiber Optic Sensing Methods for Location and Quantity Information Measurements", Opt. Eng. 41, Jan. 2002, pp. 181-189.

International Search Report and Written Opinion of the International Searching Authority, dated Jun. 5, 2007, for related International patent application No. PCT/US06/33363; published WO2007027540; 9 pages total.

International Search Report and Written Opinion of the International Searching Authority, dated Aug. 9, 2007, for related International patent application No. PCT/US06/07726; published WO2006096562; 5 pages total.

International Search Report and Written Opinion of the International Searching Authority, dated Jul. 15, 2008, for corresponding International patent application No. PCT/US07/16271; published WO2008011058; 8 pages total.

Specification, Claims, Abstract, and Figures for related U.S. Appl. No. 11/976,268, filed Oct. 23, 2007, by Duwayne Anderson, entitled Point-Locating Sensor Using Bi-Directional Phase Shift, 17 pages total.

Specification, Claims, Abstract, and Figures for related U.S. Appl. No. 61/029,289, filed Feb. 15, 2008, by Duwayne Anderson, entitled Security System Based on Fiber-Optic Sensor for Telecommunications Equipment, 30 pages total.

Specification, Claims, Abstract, and Figures for related U.S. Appl. No. 11/902,608, filed Sep. 24, 2007, by Duwayne Anderson, et al., entitled Method and Apparatus for Reducing Noise in a Fiber-Optic Sensor, 27 pages total.

* cited by examiner

DISTRIBUTED FIBER OPTIC SENSOR WITH LOCATION CAPABILITY

BACKGROUND

1. Field of the Invention

This patent application relates to spatially distributed sensor systems, and more particularly to spatially distributed, point-locating, intrusion-sensing optical fiber systems.

2. Discussion of Related Art

Fiber optic cable is well suited for distributed sensing of effects such as temperature and pressure. It's also ideally suited for sensing movement/vibration of the fiber, making it applicable for sensing intruders. Typical applications are found in security for perimeters, pipelines, rail, bridges, and other structures.

Figure 1:
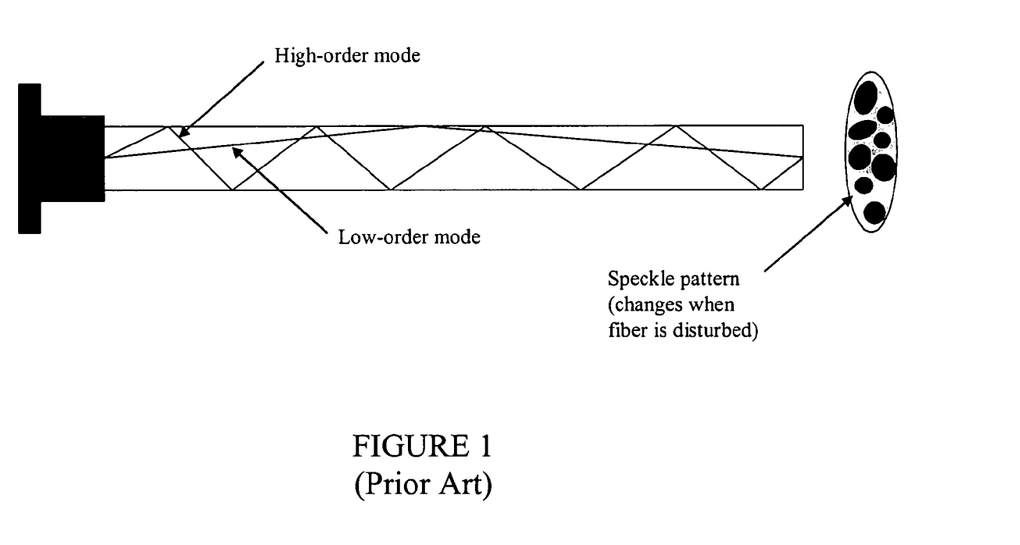
FIG. 1 is a schematic view of a simple modalmetric interferometer using multimode optical fiber.

The simplest distributed sensors provide information about disturbances along the length of the fiber, but don't discriminate regarding their locations. FIG. 1 illustrates a typical sensor, based on modal interference in a multimode optical fiber. In this sensor, light travels along many modes in the optical fiber. Because the light is coherent, there is optical interference between the modes, resulting in a speckle pattern which is familiar to all who work with coherent radiation. Disturbances in the fiber result in strain that causes time-varying differential optical path lengths among the different modes. Because of these differential path lengths, disturbances of the fiber result in time variation in the speckle pattern. Thus, the sensor works by monitoring the speckle pattern, and watching for instances when the speckle pattern flickers.

The modalmetric sensor described in FIG. 1 is very sensitive and well suited for detecting disturbances along the fiber, but it doesn't give any information about the locations or the numbers of disturbances.

Other distributed fiber sensors provide information about the location and number of disturbances, but they are considerably more complicated and expensive than the modalmetric method illustrated in FIG. 1 (and more expensive and complicated than most other distributed sensors that don't provide location information). Some point-locating sensors use wavelength scanning and bimodal fiber (the dual modes may be spatial or polarization). Still other techniques use optical time-domain reflectometry and highly coherent light sources. The following list is a representative summary of various techniques reported in the literature, describing how to measure the time and location of an intrusion using a distributed fiber-optic sensor.

*Stress-Location Measurement Along an Optical Fiber by Synthesis of Triangle-Shaped Optical Coherence Function,* Kazuo Hotate, Xueliang Song, and Zuyuan He, IEEE Photonics Technology Letters, VOL. 13, NO. 3, MARCH 2001.

*Large scale sensing arrays based on fiber Bragg gratings,* M. G. Shlyagin1, I. Márquez Borbón1, V. V. Spirin1, R. Lopez1, E. A. Kuzin2, and M. May Alarcon2, Proceedings of SPIE Vol. 4578 (2002).

*Distributed Fiber-Optic Stress-Location Measurement by Arbitrary Shaping of Optical Coherence Function,* Zuyuan He, and Kazuo Hotate, Journal of Lightwave Technology, VOL. 20, NO. 9, SEPTEMBER 2002

*Distributed Measurement of Strain using Optical Fibre Backscatter Polarimetry,* A. J. Rogers, Department of electronic engineering, King's College, London.

*Effect of the finite extinction ratio of an electro-optic modulator on the performance of distributed probe-pump Brillouin sensor systems,* Shahraam Afshar V., Graham A. Ferrier, Xiaoyi Bao, and Liang Chen, Optics Letters/Vol. 28, No. 16/Aug. 15, 2003

*Studies on a Few-Mode Fiber-Optic Strain Sensor Based on LP01-LP02 Mode Interference,* Aran Kumar, Nitin K. Goel, and R. K. Varshney, Journal of Lightwave Technology, VOL. 19, NO. 3, MARCH 2001

*Fiber-optic sensor using a tandem combination of a multimode fiber and a self-pumpedphase conjugator,* Norman S. K. Kwong, Optics Letters/Vol. 14, No. 11/Jun. 1, 1989

*Research of the distributed fiber optic pressure sensor,* LU Haibao' CHU Xingchun LUO Wusheng SHEN Tingzheng YANG, Huayong National University of Defense Technology Dept. of Mechatronics Engineering and Instrument, Changsha Hunan 41 0073 China

*Hybrid fiber-optic sensor using true heterodyne measurement techniques,* David L. Mazzoni, Kyuman Cho, and Christopher C. Davis, Optics Letters/Vol. 16, No. 8/Apr. 15, 1991

*A Novel Fiber Optic Sensor Array Based on the Sagnac Interferometer,* Benjamin J. Vakoc, Michel J. F. Digonnet, and Gordon S. Kino, Part of the SPIE Conference on Fiber Optic Sensor Technology and Applications, Boston, Mass., September 1999, 276 SPIE Vol. 3860

*Polarimetric and intermodal interference sensitivity to hydrostatic pressure, temperature, and strain of highly birefringent optical fibers,* Wojtek J. Bock and Tinko A. Eftimov, Nov. 15, 1993/Vol. 18, No. 22/Optics Letters

Figure 2:
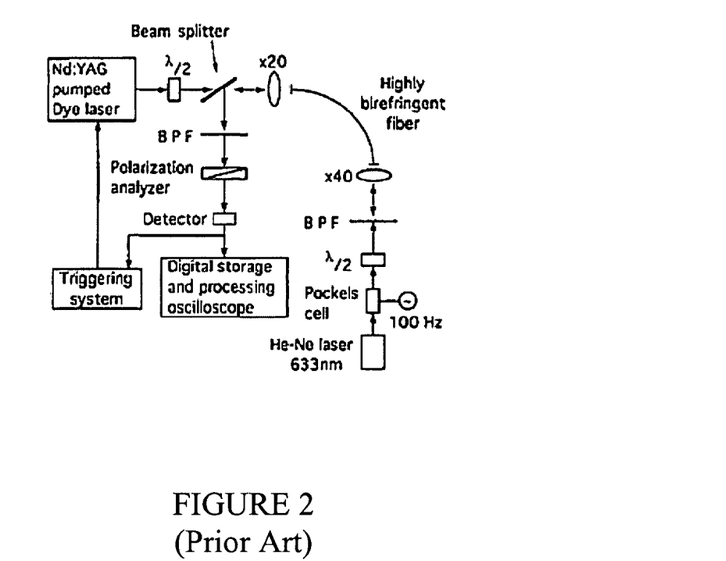
FIG. 2 illustrates a conventional point-locating, distributed fiber-optic sensor using the non-linear Kerr effect.

*Distributed optical-fiber sensor for spatial location of mode coupling by using the optical Kerr effect,* I. Cokgor, V. A. Handerek, and A. J. Rogers, May 1, 1993/Vol. 18, No. 9/Optics Letters Fiber-optic distributed sensing by a two-loop Sagnac interferometer, Xiaojun Fang, Optics Letters/Vol.21, No. 6/Mar. 15, 1996, The last two references are illustrative of the typical design for point-locating, distributed fiber-optic sensors. FIG. 2 illustrates the construction of a point-locating sensor that uses the optical Kerr effect (this figure was taken from the paper by Cokgor, Handerek, and Rogers). Although this technique works well in the laboratory, and has very good spatial resolution, it is composed of expensive components that make it difficult to commercialize in an inexpensive and practical product.

In addition to simplicity, reliability, and low cost, an important practical requirement for any distributed optical sensor used in security applications is the ability to determine the locations of multiple intruders at one time. This requirement adds further constraints on the types of sensors that can be used. This is explained succinctly in a paper by Ilkka Alasaarela, Pentti Karioja, and Harri Kopola, titled *Comparison of distributed fiber optic sensing methods for location and quantity information measurements,* and published in Opt. Eng. 41(1) 181-189 (January 2002).

Furthermore, if measurement is limited to one perturbation at a time, the possibilities and device requirements become even more flexible. In this case, interferometric techniques are valid alternatives—for vehicle location and fire detection, for example. Interferometric sensors can be used for measuring time-varying disturbances or impacts, which modulate the phase of the light inside the fiber. Actually, interferometric measurements are possible only when there is just one perturbation affecting the fiber loop. Therefore, their use is limited. Their advantages, on the other hand, include short measurement time, the applicability of short-coherence-length sources, and the possibility of simple construction.

The limitation of being able to find only one intrusion at a time is a serious one for technologies that use interferometric techniques. A marketable solution for security applications should be able to isolate multiple intrusions at one time, since the inability to isolate multiple intrusions at one time means the sensor's point-location capability can be defeated by simply vibrating the fiber near one end.

Figure 3:
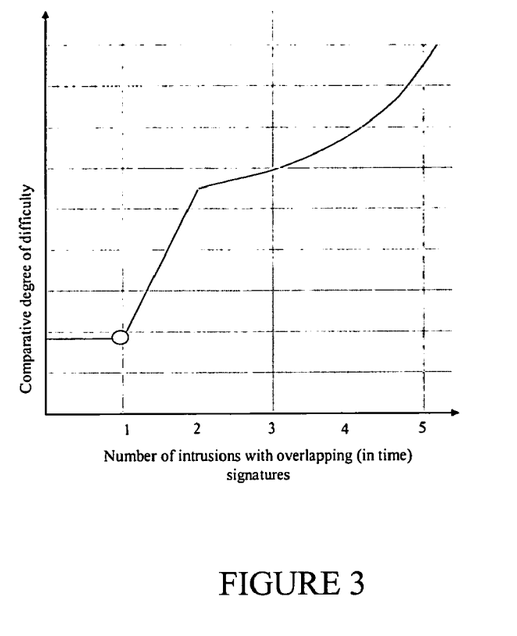
FIG. 3 is a qualitative depiction of the relative degree of difficulty in designing a distributed fiber-optic sensor that can measure several disturbances at once.
Figure 4:
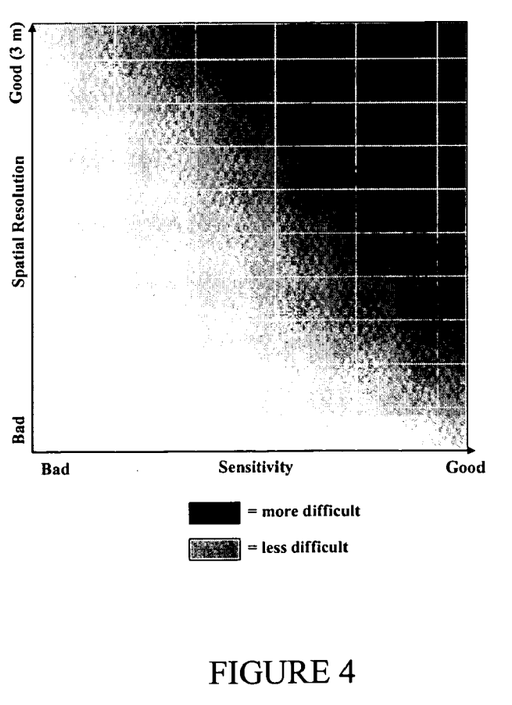
FIG. 4 is a qualitative depiction of the degree of difficulty in achieving good sensitivity and good spatial resolution simultaneously.

The problem of multiple events is also coupled to sensitivity. It's considerably more difficult to detect multiple simultaneous intrusions with good sensitivity than to achieve the same sensitivity while detecting a single intrusion. Fiber-optic sensors that provide high sensitivity and good location accuracy are also more difficult to build, and are typically expensive to manufacture. This is especially true when there is a requirement to locate multiple sources of disturbance with high spatial accuracy. Typically the simultaneous requirements for high spatial accuracy and high resolution are mutually inconsistent goals (see FIGS. 3 and 4).

What is needed is an inexpensive, sensitive, distributed fiber-optic sensor that can simultaneously identify the locations of multiple disturbances.

BRIEF SUMMARY OF THE INVENTION

It is thus an object of the current invention to provide an improved spatially distributed sensor system that has localized sensing capability.

A spatially distributed sensor system according to an embodiment of the invention has an optical transmitter, an optical conduit optically coupled to the optical transmitter at an input position, and a sensing element optically coupled to the optical conduit at a position along the optical conduit spatially separated from the input position. The sensing element is structured to split off a fraction of light from the optical transmitter upon being coupled into the optical conduit and to return light to the optical conduit. An optical receiver is coupled to the optical conduit to receive at least a portion of light from the optical conduit that includes light returned to the optical conduit from the sensing element. An analysis of light received by the optical receiver provides information to determine a position of the sensing element.

BRIEF DESCRIPTION OF THE DRAWINGS

The invention is described herein, by way of example only, with reference to the accompanying figures, in which like components are designated by like reference numerals.

DETAILED DESCRIPTION OF THE INVENTION

Figure 5:
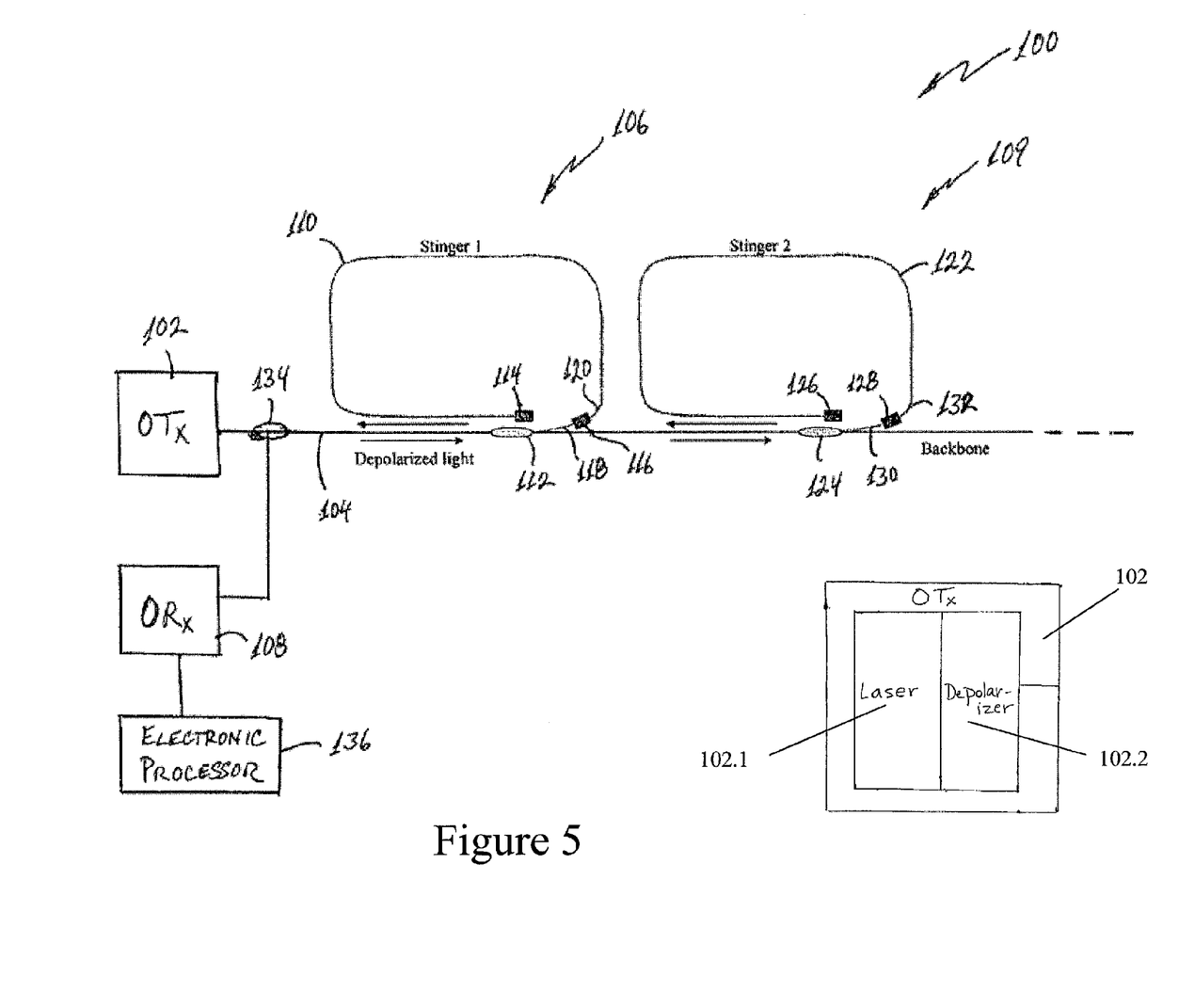
FIG. 5 is a schematic illustration of an example of a spatially distributed sensor system according to an embodiment of the invention.

FIG. 5 is a schematic illustration of a spatially distributed sensor system 100 according an embodiment of the current invention. The spatially distributed sensor system 100 has an optical transmitter 102 and optical conduit 104 optically coupled to the optical transmitter 102. (The terms "optical" and "light" are used in the general sense to include visible light as well as light not visible to the human eye.) A sensing element 106 is optically coupled to the optical conduit 104. An optical receiver 108 is optically coupled to the optical conduit 104. In addition to the sensing element 106, the spatially distributed sensor system 100 may include additional sensing elements such as sensing element 109. Although not shown in FIG. 5, the spatially distributed sensor system 100 may include three, four or even up to fifty or more sensing elements optically coupled to the optical conduit 104, each at a different position of the optical conduit 104.

In this embodiment, the sensing element 106 includes at least one length of optical fiber 110 coupled to the optical conduit 104 at a tap coupler 112. There is a mirror 114 at the end of the optical fiber 110 which may be either formed on the end of the optical fiber 110, or may be a component that is attached to the end. An inline polarizer 116 is optically coupled to portions 118 and 120 of the optical fiber 110. Typically, the inline polarizer 116 is a separate component that is attached to two portions of optical fiber 110. However, the invention is not limited to the inline polarizer 116 being a separate component as long as it is in the path of the optical fiber 110.

In this embodiment, the sensing element 106 is referred to as a "stinger." In general, each sensing element 106, 109, etc., could be different from each other, but they are shown as having basically the same structure in the embodiment of FIG. 5. In this embodiment, sensing element 109 has an optical fiber 122 attached to the optical conduit 104 at tap coupler 124. There is also a mirror 126 attached to and/or formed on an end of the optical fiber 122. An inline polarizer 128 is formed or otherwise optically coupled between portions 130 and 132 of the optical fiber 122. The sensing element 109 is referred to as stinger 2. The spatially distributed sensor system 100 may include additional stingers which could number as many as fifty stingers or more.

A transmitter 102 may be a pulsed laser, or a continuous wave laser that is modulated to produce a series of pulses or otherwise time-varying signals. In the case of a modulated laser, one may use direct modulation of the laser itself and/or external modulation. An example of direct modulation is modulating the power to the laser, thus resulting in a modulated output beam. External modulation is achieved by acting on the beam of light from the laser rather than acting on the laser itself. A Mach-Zehnder interferometer is an example of a suitable external modulator. However, the general concepts of this invention are not limited to a particular type of modulator or modulation techniques. In this case, the transmitter 102 also includes a depolarizer to provide a depolarized, time-varying source of light. The tap coupler 112 and tap coupler 124, etc., each splits off a portion of light from the optical conduit 104 to direct it into respective stingers 1, 2, etc. In this embodiment, the optical conduit 104 is also an optical fiber. If one wishes to have a large number of stingers along the optical conduit 104 of the spatially distributed sensor system 100, it is preferable that the tap couplers 112, 124, etc., each split off small portions of the transmitted light that reaches it. For example, a tap coupler that splits off between 2% and 5% of transmitted light incident thereon, has been found to be suitable for this embodiment of the invention.

A receiver 108 is optically coupled to the optical conduit 104, for example by splitter 134. The receiver 108 may include an optical detector such as a photodiode or other suitable detector to convert the optical signal into an electrical signal. An electronic processor 136 receives electrical signals output from the receiver 108 to process the data to determine the presence of an event sensed at one or more of the sensors 106, 109, etc. In this embodiment, the transmitter 102 outputs a plurality of pulses that are detected by receiver 108 and processor 136 through time division multiplexing.

A transmitter 102 may be a pulsed laser 102.1, or a continuous wave laser that is modulated to produce a series of pulses or otherwise time-varying signals. In the case of a modulated laser, one may use direct modulation of the laser itself and/or external modulation. An example of direct modulation is modulating the power to the laser, thus resulting in a modulated output beam. External modulation is achieved by acting on the beam of light from the laser rather than acting on the laser itself. A Mach-Zehnder interferometer is an example of a suitable external modulator. However, the general concepts of this invention are not limited to a particular type of modulator or modulation techniques. In this case, the transmitter 102 also includes a depolarizer 102.2 to provide a depolarized, time-varying source of light. The tap coupler 112 and tap coupler 124, etc., each splits off a portion of light from the optical conduit 104 to direct it into respective stingers 1, 2, etc. In this embodiment, the optical conduit 104 is also an optical fiber. If one wishes to have a large number of stingers along the optical conduit 104 of the spatially distributed sensor system 100, it is preferable that the tap couplers 112, 124, etc., each split off small portions of the transmitted light that reaches it. For example, a tap coupler that splits off between 2% and 5% of transmitted light incident thereon, has been found to be suitable for this embodiment of the invention.

As long as the optical fiber 110 remains undisturbed, the amount of light returned from substantially equal successive pulses remains substantially constant. If the stinger, for example stinger 1, is disturbed such as by being moved in some way, the birefringence of the fiber will change, thus leading to a change in the amount of light directed back into the optical conduit 104. In this embodiment, the optical conduit 104 is an optical fiber and since the light is depolarized, it is insensitive to be moved or otherwise distributed. Thus, the stinger, such as stinger 1, provides a measure of a disturbance localized between tap coupler 112 and the end of the optical fiber 110 at the mirror 114. Information about the time for the pulse to travel from transmitter 102 to the sensing element 106 and then back to the receiver 108 allows one to implement an algorithm within the electronic processor 136 to determine the position along the optical conduit 104 of the sensing element 106.

The pulse transmitted from transmitter 102 continues beyond the coupler 112 and a portion of it is also coupled into the sensing element 109. This process is repeated along the entire optical conduit 104, which may be referred to as the "optical backbone" in the case illustrated in FIG. 5. This leads to a received pulse from each sensing element for a given pulse from a transmitter 102. For example, in an embodiment in which there are fifty stingers, there will be fifty return pulses for each transmitted pulse. One may implement a variety of algorithms to positively identify a location of each sensing element 106, 109, etc., such as delaying the transmission of additional signal pulses from the transmitter 102 until after all pulses have been received by receiver 108 after returning from all sensing elements 106, 109, etc.

This embodiment is described in terms of optical fibers providing the optical paths. However, general concepts of the invention are not limited to only optical fibers. One may implement the invention using other types of optical waveguides, or even using a free space implementation of the broad concepts of this invention.

Many modifications of this embodiment of the invention may be made without departing from general concepts of the invention. For example, instead of optical fiber 110, and/or 122, etc., one may use optical fibers that change their optical properties in the presence of certain chemical agents. For example, optical fibers that change their optical density in the presence of certain chemical agents may be used. Optical fibers that darken, i.e., increase attenuation, in the presence of chlorine gas are available and suitable to use in such a spatially distributed sensor system. In such a case, it is not necessary to depolarize the light from the transmitter 102 and the inline polarizers 116, 128, etc., are not needed. In the former case, the combination of depolarized light in the optical conduit and polarized light in the sensing elements 106, 109, etc., are used since the detection mechanism relies on changes in birefringence of the stingers. In the above-noted modified embodiment, changes in the optical density of one or more of the stingers due to the presence of a chemical agent leads to the detected changes in received pulses.

Figure 6:
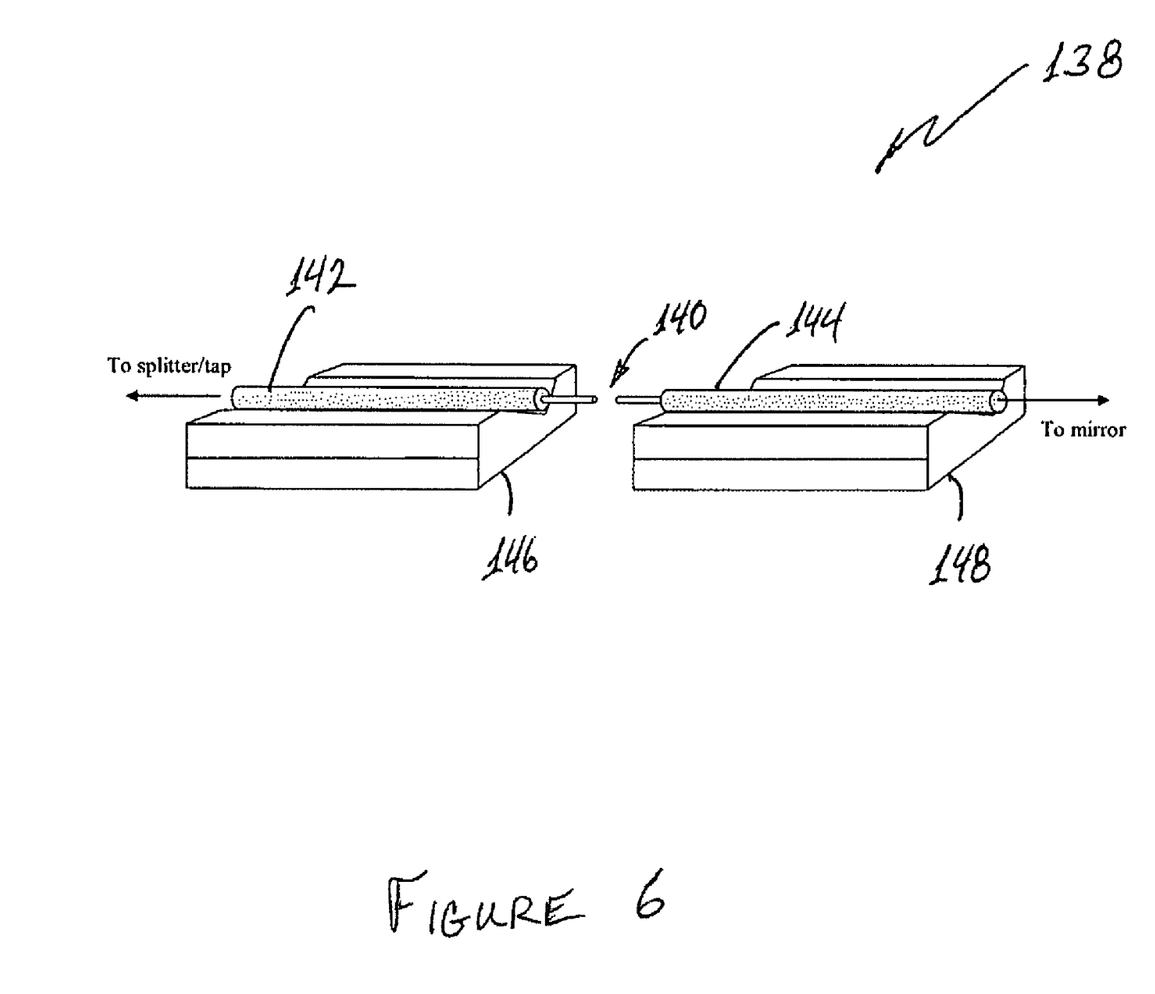
FIG. 6 is a schematic illustration of an example of a vibration sensor according to an embodiment of the invention.

These are only a couple of examples of the concepts of the embodiment of FIG. 5. In another modification of the spatially distributed sensor system 100 illustrated in FIG. 5, one may include a vibration sensor 138 disposed along the length of the optical fiber 110, and/or 122, etc. An example of such a vibration sensor is illustrated schematically in FIG. 6. In this case, the optical fiber 110 is separated to reserve a space between opposing ends at a position 140. A first portion 142 is opposed to a second portion 144 of the optical fiber 110. The portion 142 may be secured to the fiber mount 146 and the portion 144 of the optical fiber may be secured to a fiber mount 148. In an undisturbed state, the fiber portions 142 and 144 are aligned to couple light traveling between the two fiber portions. A change in the optical alignment between the portions 144 and 142 at 140 due to vibrations, for example, or a sudden displacement, leads to a change in the amount of optical coupling between the ends 142 and 144, thus leading to a change in the strength of the pulses received at the receiver 108. The vibration sensor 138 may be used in one or more of the sensor elements 106, 109, etc., or there may be one or more within a given sensor element, such as sensor element 106.

Figure 7:
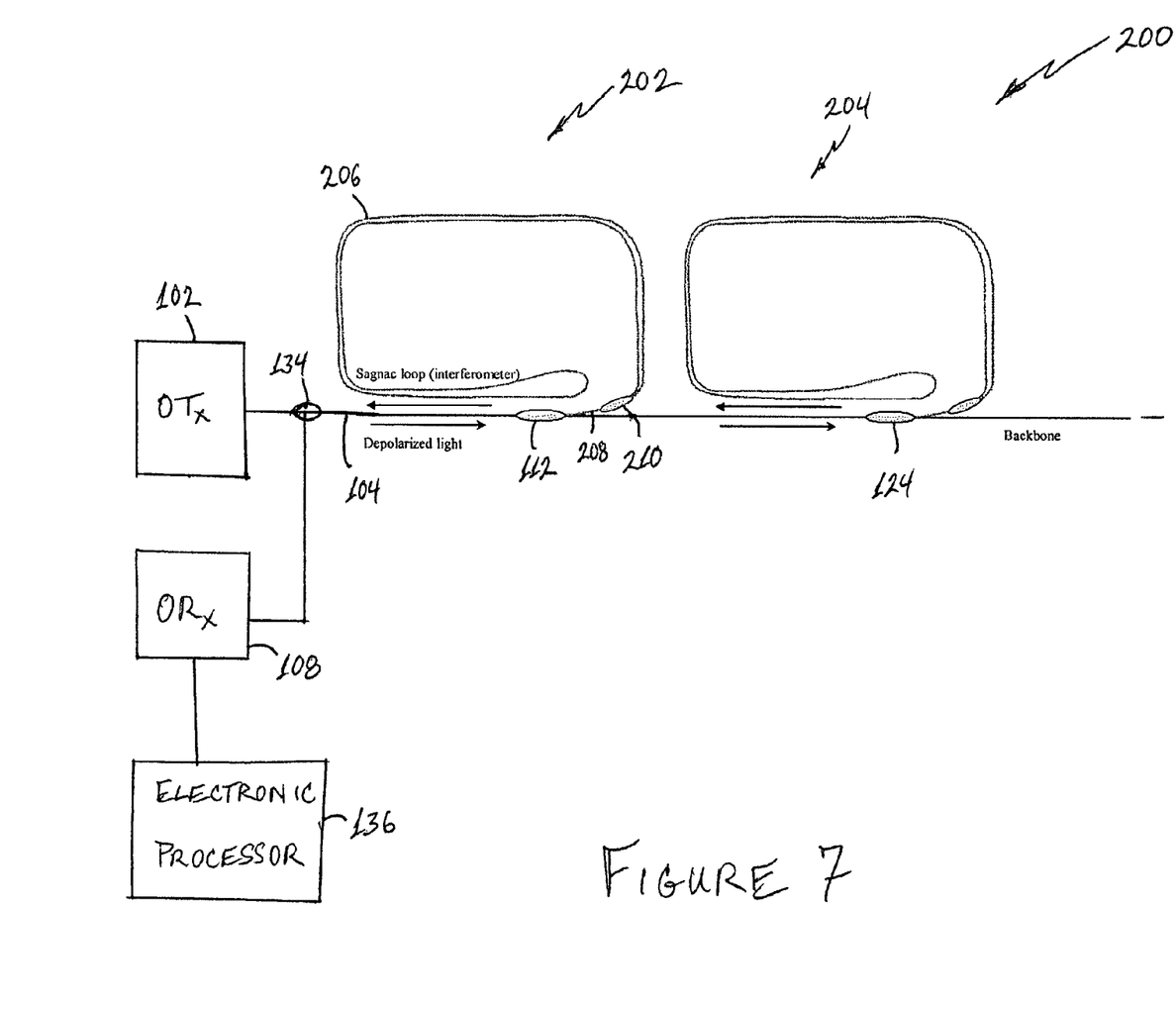
FIG. 7 is a schematic illustration of an example of a spatially distributed sensor system according to another embodiment of the invention.

FIG. 7 illustrates another embodiment of a spatially distributed sensor system 200 according to the current invention. Similar to the embodiment of FIG. 5, this embodiment has a transmitter 102, optical conduit 104, receiver 108, tap couplers 112, 124, and processor units 136. These components may be similar or the same as those described in reference to the embodiment of FIG. 5. As in the previous embodiments, the optical conduit 104 may provide either polarized or depolarized light. In the embodiment illustrated in FIG. 7, the optical conduit 104 provides depolarized light. The spatially distributed sensor system 200 has a sensing element 202 optically coupled to the optical conduit 104. One may also include additional sensor elements, such as sensor element 204, optically coupled to the optical conduit 104 at different positions from that of sensor element 202.

Although FIG. 7 shows an example of two sensing elements 202 and 204, one may have one, two, three, or more sensing elements, and possibly as many as fifty or more, as desired. The sensing element 202 includes a Sagnac interferometer 206 coupled to the optical conduit 104 through a portion of optical fiber 208 and 50/50 coupler 210. In this embodiment, the Sagnac interferometer is an optical fiber loop coupled to the 50/50 coupler 210. Light split off from the optical conduit 104 at tap coupler 112 travels through fiber portion 208 and is then splits to travel in both directions around the interferometer loop 206. The counter-rotating beams of light come together again at the 50/50 coupler 210 and interfere either constructively or destructively while being coupled back into the optical conduit 104 to travel back to the receiver 108 to be received and processed by electronic processor 136. Disturbances of the Sagnac interferometer, such as movement, rotation, etc., leads to a change in the interference of the counter-rotating beams at 50/50 coupler 210 and thus leads to a change in the signal returned to the receiver 108.

Many modifications and alternatives to the illustrative embodiments described above are possible without departing from the scope of the current invention, which is defined by the claims.

We claim:

1. A spatially distributed sensor system, comprising:
   an optical transmitter;
   an optical conduit optically coupled to said optical transmitter at an input position;
   a spatially distributed sensing element optically coupled to said optical conduit at a position along said optical conduit spatially separated from said input position,
      wherein said sensing element is structured to split off a fraction of light from said optical transmitter upon being coupled into said optical conduit and to return light to said optical conduit in an amount responsive to a mechanical effect being sensed; and
   an optical receiver coupled to said optical conduit to receive at least a portion of light from said optical conduit that includes light returned to said optical conduit from said sensing element,
   wherein said optical transmitter comprises a laser and a depolarizer to provide depolarized light to input into said optical conduit, and
   wherein the sensing element comprises an optical path defined by (1) a polarizer disposed between and optically coupled to the optical conduit and a first end of a length of optical fiber and (2) a reflecting element disposed at and optically coupled to a second end of the optical fiber so that depolarized light is polarized along the optical path before being returned to the optical conduit, and the state of the at least one sensing element is determinable from the polarization properties of light transmitted to the optical receiver via the optical conduit based on changes in the birefringence of the optical fiber in the optical path.

2. A spatially distributed sensor system according to claim 1, wherein said laser being modulated to produce a time varying source of light.

3. A spatially distributed sensor system according to claim 2, wherein said laser is a pulsed laser.

4. A spatially distributed sensor system according to claim 2, wherein said laser is directly modulated to produce a pulsed signal, wherein a time between transmission and reception of a pulse of light from said pulsed signal provides information to determine said position of coupling of said sensing element to said optical conduit.

5. A spatially distributed sensor system according to claim 2, wherein said optical transmitter further comprises an external modulator, wherein said laser is externally modulated to produce a pulsed signal, and wherein a time between transmission and reception of a pulse of light from said pulsed signal provides information to determine said position of coupling of said sensing element to said optical conduit.

6. A spatially distributed sensor system according to claim 1, wherein said optical conduit is an optical fiber, and wherein said optical fiber in the optical path is coupled to said optical conduit by a tap coupler.

7. A spatially distributed sensor system according to claim 6, wherein said sensing element further comprises a substantially 50/50 coupler coupled to an end of said optical fiber of said sensing element and a second optical fiber having both ends coupled to said substantially 50/50 coupler to form a Sagnac interferometer loop.

8. A spatially distributed sensor system according to claim 6, wherein said tap coupler allows at least 90% of light to pass said sensing element without entering said sensing element.

9. A spatially distributed sensor system according to claim 6, wherein said tap coupler directs between 0.5% and 6% of light in said optical conduit into said sensing element.

10. A spatially distributed sensor system according to claim 1, wherein said optical fiber of said sensing element is a single-mode optical fiber at a wavelength of operation of the spatially distributed sensor system.

11. A spatially distributed sensor system according to claim 1, further comprising a second sensing element according to claim 1 optically coupled to said optical conduit at a second position along said optical conduit spatially separated from said input position and the first-mentioned position of coupling of the first-mentioned sensing element,
   wherein said second sensing element is structured to split off a second fraction of light from said optical transmitter upon being coupled into said optical conduit and to return light to said optical conduit in a second amount responsive to a second effect being sensed,
   wherein said optical receiver is structured to receive at least a portion of light from said optical conduit that includes light returned to said optical conduit from said second sensing element, and
   wherein an analysis of light received by said optical receiver provides information to determine a position of said second sensing element.

12. A spatially distributed sensor system according to claim 1, further comprising a plurality of sensing elements each according to claim 1 and each optically coupled to said optical conduit at respective plurality of positions along said optical conduit,
   wherein each said sensing element splits off light from said optical conduit and returns light to said optical conduit in respective amounts responsive to respective effects being sensed,
   wherein said optical receiver is structured to receive at least a portion of light from said optical conduit that includes light returned to said optical conduit from each said sensing element, and
   wherein an analysis of light received by said optical receiver provides information to determine positions of each of said plurality of sensing elements.

13. A spatially distributed sensor system, comprising:
   an optical conduit;
   an optical transmitter comprising a light source assembly for inputting depolarized light into the optical conduit, the optical transmitter being optically coupled to the optical conduit;
   a plurality of spatially distributed sensing elements spaced along and optically coupled to the optical conduit, each sensing element comprising a wave guide providing an optical path for to travel through sensing element and back into the optical conduit, wherein each sensing element of said plurality of sensing elements is structured to return light to the optical conduit with a first set of characteristics when the sensing element is in a first state and to return light to said optical conduit with a second set of characteristics when the sensing element is induced into a second state by a physical disturbance to it, and wherein the second set of characteristics are based on a change in the birefringence and/or interference patterns in the wave guide; and an optical receiver coupled to said optical conduit and configured to receive light from the sensing elements and output a signal indicative of the state of the sensing element.

14. A spatially distributed sensor system according to claim 13, wherein said optical conduit is an optical fiber.

15. A spatially distributed sensor system according to claim 13, wherein a sensing element of said plurality of sensing elements comprises an interferometer.

16. A spatially distributed sensor system according to claim 13, wherein a sensing element of said plurality of sensing elements comprises an optical fiber that changes an optical transmission property upon contact with a substance being detected.

17. The system of claim 13 wherein at least one sensing element comprises (1) a polarizer disposed between and optically coupled to the optical conduit and a first end of a length of optical fiber and (2) a reflecting element disposed at and optically coupled to a second end of the optical fiber so that depolarized light is polarized along the optical path of the sensing element before being returned to the optical conduit, and the state of the at least one sensing element is determinable from the polarization properties of light transmitted to the optical receiver via the optical conduit.

18. The system of claim 17 further comprising an electronic processor coupled to the optical receiver so as to receive electronic data signals output from the optical receiver and for processing the data signals to determine the state of the at least one sensing element.

19. The system of claim 17 wherein the transmitter comprises a pulse modulated transmitter and the optical receiver can output data signals corresponding to the pulses to the electronic processor, and the processor implements a time division multiplexing algorithm to determine state of the at least one sensing element.

20. The system of claim 19 wherein the electronic processor implements an algorithm to determine location of a sensing element that has changed from the first state to the second state.

21. The system of claim 17 wherein the sensing element can change its birefringence in response and the optical receiver outputs a data signal usable by the electronic processor to determine a change in state of the sensing element based on the change in birefringence.

22. The system of claim 21 wherein the electronic processor implements an algorithm to determine location of a sensing element that has changed from the first state to the second state.

23. The system of claim 13 wherein the sensing element comprises an optical fiber loop for receiving and returning light from and to the optical conduit, and the optical receiver outputs a data signal usable by the electronic processor to determine a change in state of the sensing element based on changes in interference in the loop.

24. A method of sensing a spatially localized effect, comprising:
generating a pulse of polarized light and depolarizing said pulse of polarized light to form a pulse of signal light;
transmitting said pulse of signal light along an optical conduit;
splitting off a fraction of light from said pulse of signal light at each of a plurality of spatially distributed sensors spaced along an optical conduit and polarizing said fraction of light; and
returning light to said optical conduit from each of said plurality of spatially localized sensors in an amount indicative of an effect being detected based on a change in the birefringence of one or more of the sensors,
wherein at least one of said plurality of spatially distributed sensors is responsive to a mechanical effect to sense the presence of an intruder.

* * * * *